(12) United States Patent  (10) Patent No.: US 8,274,287 B2
Martin  (45) Date of Patent: Sep. 25, 2012

(54) METALLIC DEBRIS DETECTION SENSOR

(75) Inventor: Graham Martin, Bothwell (GB)

(73) Assignee: Impact Technologies, LLC, Rochester, NY (US)

( * ) Notice: Subject to any disclaimer, the term of this patent is extended or adjusted under 35 U.S.C. 154(b) by 429 days.

(21) Appl. No.: 12/300,500

(22) PCT Filed: Apr. 30, 2007

(86) PCT No.: PCT/GB2007/001588
§ 371 (c)(1),
(2), (4) Date: Dec. 1, 2009

(87) PCT Pub. No.: WO2007/132154
PCT Pub. Date: Nov. 22, 2007

(65) Prior Publication Data
US 2010/0066354 A1  Mar. 18, 2010

(30) Foreign Application Priority Data
May 13, 2006 (GB) .................................. 0610362.6

(51) Int. Cl.
*G01V 3/00* (2006.01)
*G01N 27/82* (2006.01)
(52) U.S. Cl. .......................... 324/334; 324/220; 324/303
(58) Field of Classification Search .................. 324/204, 324/220–221, 303, 324, 333–343
See application file for complete search history.

(56) References Cited

U.S. PATENT DOCUMENTS

| 5,175,544 | A | * | 12/1992 | McKeen | 341/52 |
| 5,451,873 | A | * | 9/1995 | Freedman et al. | 324/303 |
| 6,227,045 | B1 | * | 5/2001 | Morse et al. | 73/204.22 |
| 6,243,657 | B1 | * | 6/2001 | Tuck et al. | 702/150 |
| 6,297,626 | B1 | * | 10/2001 | Boston et al. | 324/204 |
| 6,757,635 | B2 | * | 6/2004 | Topmiller | 702/150 |
| 7,068,027 | B1 | * | 6/2006 | Mastro et al. | 324/204 |
| 8,098,063 | B2 | * | 1/2012 | Paulson | 324/220 |
| 2002/0024053 | A1 | * | 2/2002 | Inoue et al. | 257/79 |
| 2002/0113869 | A1 | * | 8/2002 | Kirkwood | 348/84 |

FOREIGN PATENT DOCUMENTS

EP 0517481 12/1992
EP 0778937 1/1999

* cited by examiner

*Primary Examiner* — Joshua Benitez
(74) *Attorney, Agent, or Firm* — Scott D. Swanson; Dykas & Shaver, LLP

(57) ABSTRACT

The present invention relates to a sensor arrangement. In particular, a sensor for the measurement of magnetically active or ferrous debris, for example, as generated as a result of machine wear. There is provided a sensor (5) having a magnetic sensor head adapted to produce a magnetic field, —a magnetic field sensor (10) responsive to changes in the magnetic field; a temperature probe (15); and processing means (50) for determining the amount of debris accumulated on the magnetic sensor head based on both magnetic field and temperature data.

15 Claims, 4 Drawing Sheets

METALLIC DEBRIS DETECTION SENSOR

The present invention relates to a sensor arrangement. In particular, a sensor for the measurement of magnetically active or ferrous debris, for example, as generated as a result of machine wear.

BACKGROUND OF THE INVENTION

Metallic debris detection sensors are known that use a magnetic sensor head and a hall-effect sensor, such as the hall-effect sensors sold under the trade name Micronas 815 or 855. The hall-effect sensor generates an error signal corresponding to the magnetic field at the probe. The sensor head is placed in a fluid medium, such as machine lubricant, and metallic debris is attracted from the fluid onto the magnetic sensor head. This accumulation of metallic debris on the magnetic head alters the effective magnetic field of the sensor head and thereby the error signal generated by the hall-effect sensor. The analogue error signal from the hall-effect sensor is digitized, typically using a 12-bit analogue to digital converter (ADC), then scaled and output as a signal indicative of the accumulation of debris. The digitized signal is input into a programmable integrated circuit (PIC). The PIC takes the digitized signal and converts it into a quantifiable amount of debris.

The signal produced by these prior art devices is responsive not only to debris on the sensor head but also to temperature. For use in certain situations, for example in a machine operating in a steady state and at constant speed, the operating temperature remains reasonably static and the known sensor operates satisfactorily. However, if the operation of the machinery results in thermal variations in the measured medium, then the output of the device is subject to variations due to the changes in operating temperature, which the device interprets as a change in debris accumulation, resulting in a drift or error in the output of the device.

SUMMARY OF INVENTION

According to a first aspect of the present invention, there is provided a sensor having a magnetic sensor head adapted to produce a magnetic field; a magnetic field sensor responsive to changes in the magnetic field; a temperature probe; and processing means for determining the amount of debris accumulated on the magnetic sensor head based on both magnetic field and temperature data.

The sensor may be a magnetically active or ferromagnetic debris sensor.

The magnetic field sensor may be adapted to measure magnetic field strength. The magnetic field sensor may be a hall-effect sensor.

The magnetic sensor head may include a pair of permanent magnets. The magnets may be electro-magnets.

The temperature probe may be a resistance temperature detector (RTD). The temperature probe may be a temperature probe having a linear temperature response.

The processing means may be a peripheral interface controller (PIC). The processing means may contain memory. The processing means may be adapted to determine the amount of ferromagnetic and/or magnetically active material accumulated on the magnetic sensor head by comparing measured magnetic field and temperature data with data stored in a look up table (LUT). The LUT may be stored in the memory of the processing means.

The LUT may be arranged to contain data specific for the associated sensor.

The processing means may be adapted to self calibrate the sensor by using the LUT to determine deviations in magnetic strength with time.

The sensor may further include an analogue to digital converter (ADC) for converting an analogue output of the magnetic field sensor and/or temperature probe to a digital signal for input to the processing means. The ADC may be adapted to sample the output of the magnetic field sensor and/or temperature probe. The ADC may be a 16 bit ADC and/or be adapted to sample with at least 65535 steps of resolution and/or be adapted to sample between 1 and 10 times per second.

The magnetic sensor head may be a potted sensor head. The magnetic field sensor and/or the temperature probe may be placed inside the potted sensor head.

The sensor may contain fixtures for securing the sensor to a vessel or pipe. The sensor may further include actuating means adapted to move the sensor to thereby vary the degree of insertion of the sensor into the vessel or pipe. The actuating means may include a stepper motor. The actuating means may be controllable from a controller within the sensor.

According to a second aspect of the present invention is a manifold for receiving a debris sensor, the manifold having at least a first flow channel and a second flow channel, and means for receiving the debris sensor such that the debris sensor is mechanically interfaced with one of the flow channels.

The sensor may be adapted to be located in the first flow channel. The second flow channel may define a bypass channel to circumvent the sensor. The second channel may have an adjustable valve or flow restricting device for controlling flow through the second channel and thereby the flow in the first channel.

According to a third aspect of the present invention is a method for detecting magnetically active or ferrous debris including providing a sensor having a magnetic sensor head adapted to produce a magnetic field; measuring changes in the magnetic field; measuring the temperature of the sensor; and determining the amount of ferrous material accumulated in the magnetic sensor head based on both magnetic field and temperature data.

According to a fourth aspect of the present invention is a method for assembling a debris sensor including the steps of positioning a magnetic field sensor and at least one magnetic pole piece against a jig and securing the magnetic field sensor relative to the pole piece.

The jig may be magnetic.

According to a fifth aspect of the present invention is a method for assembling a debris sensor including the step of inserting a spacer between at least two magnetic poles and securing the poles against movement relative to each other.

BRIEF DESCRIPTION OF THE DRAWINGS

Various aspects of the invention will now be described by way of example only with reference to the accompanying drawings, of which.

DETAILED DESCRIPTION OF THE DRAWINGS

Figure 1:
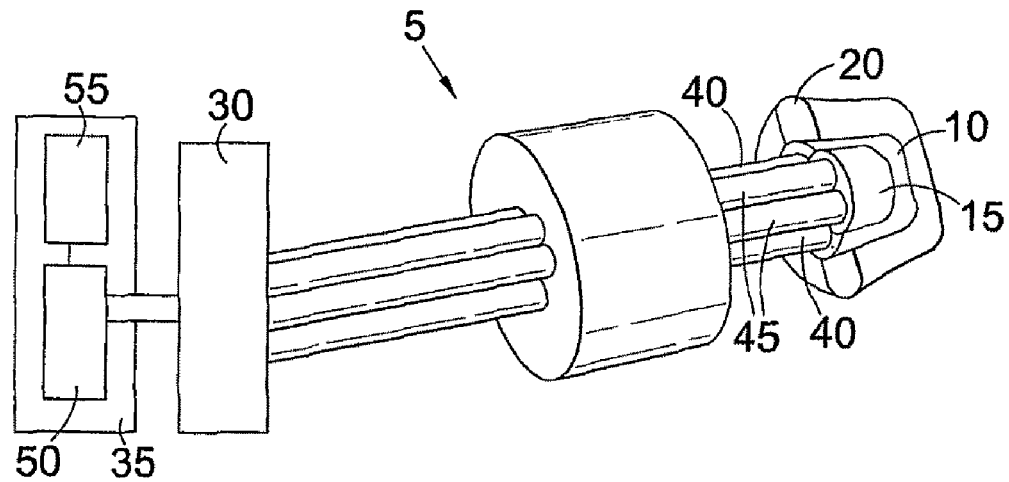
FIG. 1 is a view of a partially constructed probe according to an aspect of the present invention.
Figure 2:
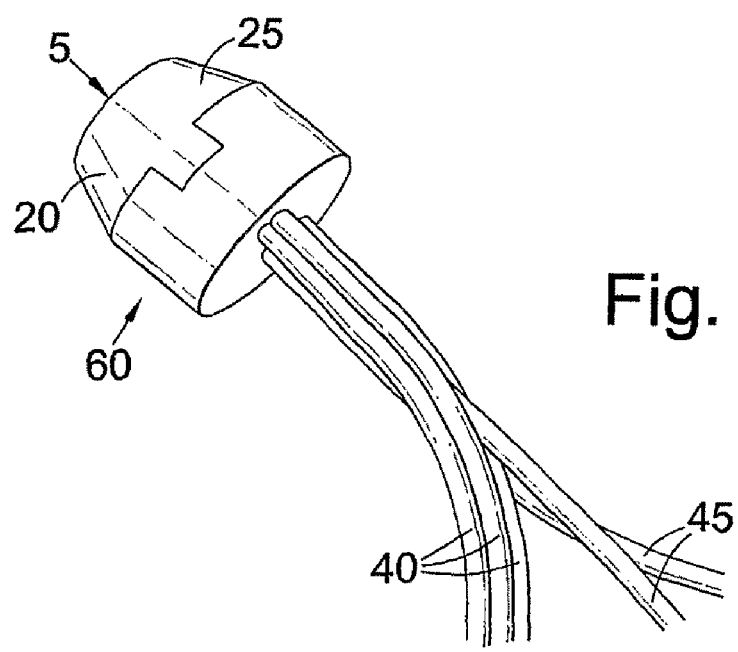
FIG. 2 is a view of the probe of FIG. 1 when fully constructed.

FIGS. 1 and 2 show a debris probe 5 having a hall-effect sensor 10 and a resistance temperature detector RTD 15 located between two permanent magnet poles 20, 25. The hall-effect sensor 10 is adapted to output a current that depends on the magnetic field at the sensor 10. The RTD 15 is adapted to produce an output current that is linearly dependant on temperature. The current from the hall-effect sensor 10 and the current from the RTD 15 are relayed to an analogue-to-digital converter (ADC) 30 and thereby to a programmable integrated control circuit, such as a peripheral interface controller (PIC) 35 via connector cables 40 and 45 respectively.

The hall-effect sensor 10 may be any suitable hall-effect sensor known in the art such as a Micronas 815 or 855 Hall effect Sensor. The hall-effect sensor 10 is adhered to at least one of the poles 20, 25 using an adhesive such as superglue.

The RTD 15 is affixed against the hall-effect sensor 10 using an adhesive such as superglue. This allows for a high degree of thermal communication between the hall probe and RTD, which advantageously results in accurate monitoring of the hall probe temperature and easier assembly of the sensor.

The ADC 30 is advantageously a high resolution ADC, sampling at 65535 steps per conversion and at 16-bit resolution or above. The ADC 30 is generally operated at a sample rate of between 1 and 10 samples per second. ADC's of this type have been found to express the temperature variations using small enough linear portions and providing the precision necessary to allow for the non-linear response of the magnets to temperature to be characterised to the required precision. The accuracy afforded by the ADC 30 is increased further by processing the digital profile using an intelligent smoothing algorithm.

The PIC 35 contains a processor 50 and memory 55. The memory 55 is operable to store look-up tables (LUTs) containing correction values for the change in magnetic field with temperature. The correction values are written to the memory during a pre-use calibration stage and are unique to each sensor. The processor 50 receives digitized signals via the ADC 30 from both the RTD 15 and the hall-effect sensor 10. The processor 50 is operable to obtain correction values from the LUTs in the memory 55 based on the signal value obtained from the RTD 15. The correction values are usable to correct the output from the hall-effect sensor 10 to allow for temperature variations. Thus, the output from the hall-effect sensor 10 depends on the amount of debris accumulated on the magnetic poles 20, 25 and not variations in the magnetic field strength caused by changing temperature. In this way, the sensor 5 is essentially self-calibrating as the temperature changes.

The hall-effect sensor 10 and RTD 15 are contained within a potted sensor head 60. The potted sensor head 60 contains fittings 65 onto which the hall-effect sensor 10 and RTD 15 can be located. The sensor head is sealed by an epoxy resin such as Araldite 2014 in the gaps between the components 10, 15, 20 and 25 and the potted sensor head 60.

Figure 3:
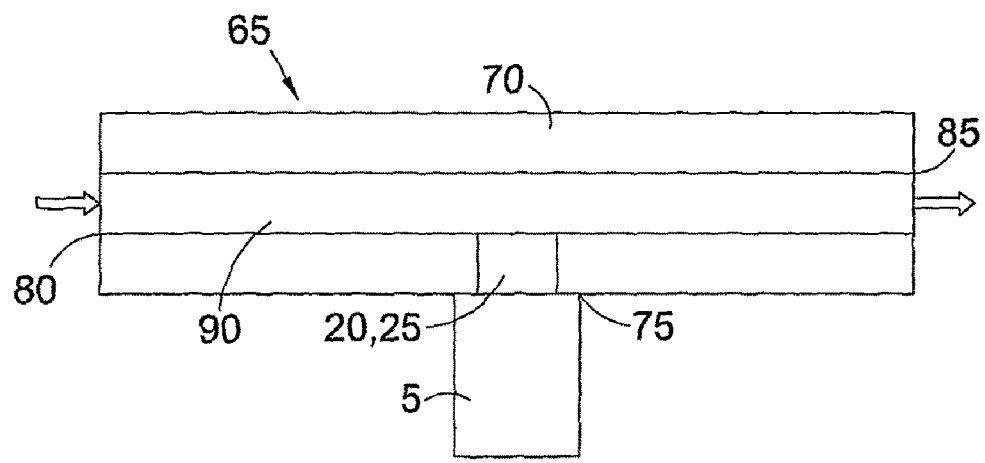
FIG. 3 is a schematic of a manifold for use with the probe of FIG. 1.

Effective operation of the sensor 5 may be dependant upon the flow of fluid over the sensor head. Too much flow can lead to pressure increases and mean that the flow across the sensor head is too great, resulting in inefficient capture of debris. Too low a flow can lead to build-up on the sensor head that may not be removable during the sensor head cleansing or flushing process and therefore unrepresentative of the next sampling period accumulation of debris. To control the flow experienced by the sensor 5, the sensor 5 is placed within a flow divider manifold 65, shown in FIG. 3, that is connectable to a pipe or vessel (not shown) adapted to contain a flowing fluid, such as oil.

The manifold 65 consists of a tubular conduit 70 having a fitment port 75 for attaching the sensor 5. The conduit 70 has inlet and outlet fittings, 80 and 85 respectively, at respective ends for connecting the manifold 65 to the pipe system or vessel. The fittings 80, 85 may either be integral with the conduit 70 or removably attached. The fitment port 75 has fixings for cooperating with corresponding fixings on the sensor for securing the sensor in the fitment port. The conduit 70 defines a through bore 90 having a gauge smaller than that of the pipe system to which it is to be connected, thus defining a restriction. The through bore is sized and shaped depending on a number of factors such as the physical properties of the fluid and the inlet pressure in order to control the flow at the sensor head to be between 1 and 20 liters per minute.

The debris sensor 5 is attachable to the fitment port 75 such that it forms a seal with the fitment port 75 and projects such that it is in communication with fluid flow in the bore 90. The sensor 5 is actuatable using a linear stepper motor to control the degree of insertion of the sensor 5 into the fluid flow.

Figure 4:
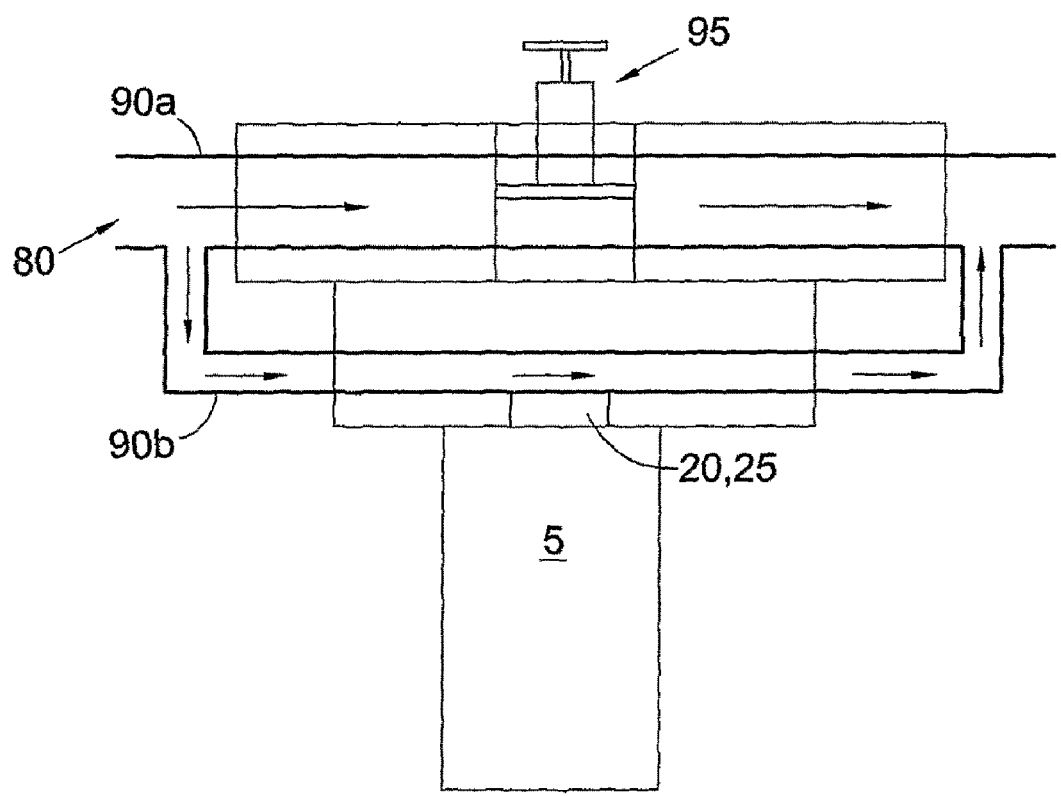
FIG. 4 is a schematic of an alternative manifold for use with the probe of FIG. 1.

In an alternate embodiment, as shown in FIG. 4, an alternate manifold is shown in which the conduit defines two flow channels, namely, a bypass channel 90*a* and an instrument channel 90*b*. The flow at the inlet 80 is split between the bypass 90*a* and the instrument 90*b*. The instrument loop contains the fitment port 75 for the sensor 5 such that the sensor head is in communication with the fluid in the instrument channel 90*b*. The bypass 90*a* contains an adjustable valve or flow restricting device 100, which is operable to control the flow through the bypass and thereby the flow through the instrument loop 90*b*. In this way, the flow though the instrument loop 90*b* is controllable to ensure optimum flow conditions of between 1 and 20 liters per minute.

Figure 5:
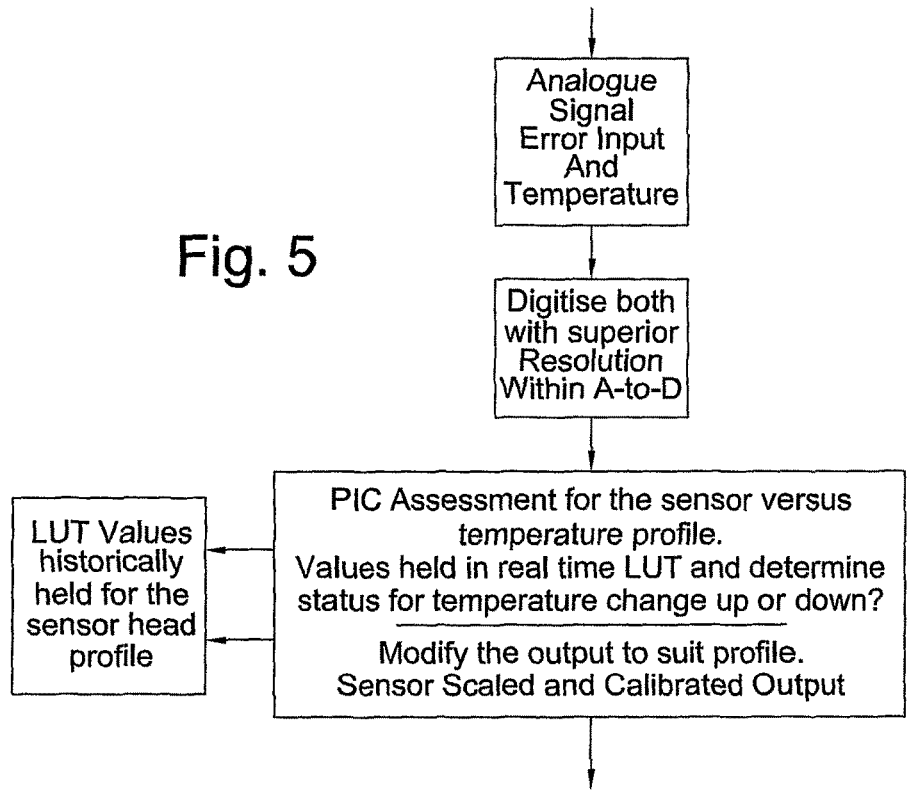
FIG. 5 shows a flow diagram for operation of the sensor of FIG. 1.

FIG. 5 shows a method for operating the debris probe 5. Both the temperature signal from the RTD 15 and the magnetic field signal from the hall-effect sensor 10 are measured. The analogue temperature and magnetic field signal are sampled using a high resolution digitizing device (30 on FIG. 1), with each measurement profile being sampled into 65,535 steps. The digitized temperature and magnetic field signals are passed to the PIC (35 on FIG. 1), which accesses a look-up table stored on the PIC's memory (55 on FIG. 1) containing calibration data for the sensor 5 at the measured temperature. This results in a signal that is dependant on the amount of debris on the sensor (5 on FIG. 2) but not the temperature.

Figure 6:
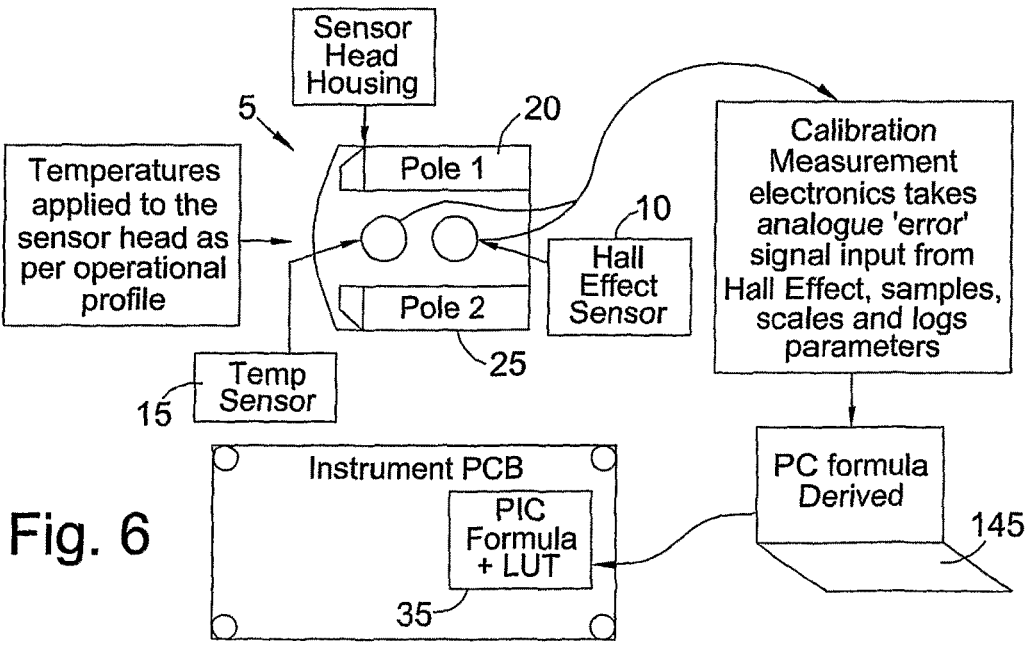
FIG. 6 shows a flow diagram of a calibration scheme for the sensor of FIG. 1.

FIG. 6 shows a method for calibrating the sensor 5. A sensor 5 having a clean sensor head, i.e. with no debris present, is slowly stepped in fractions of a degree Celsius from a minimum operating temperature to a maximum operating temperature and back to the minimum operating temperature. The output from the hall-effect sensor 10 is monitored over this operation. The high resolution ADC 30 is used to convert the analogue temperature verses magnet response data into the digital domain. Sampling electronics are used to map the non-linear response of the magnets 20, 25 to temperature using a high number of sampling steps in the ADC to minimize the size of the linear portions in the data and an intelligent smoothing algorithm is used to optimise the data. This data is then input to a computer system 145 that is arranged to calculate a set of correction values that adjust for the temperature response of the magnetic poles 20, 25 used in that sensor 5. The sensor specific correction values are then programmed into the memory of the sensor's PIC 35.

The sensor 5 is assembled by first testing the magnetic poles 20, 25 using a magnetic strength meter to ensure that the magnetic strength lies in an acceptable performance range of between 2663 and 2966 ADCs.

Figure 7A:
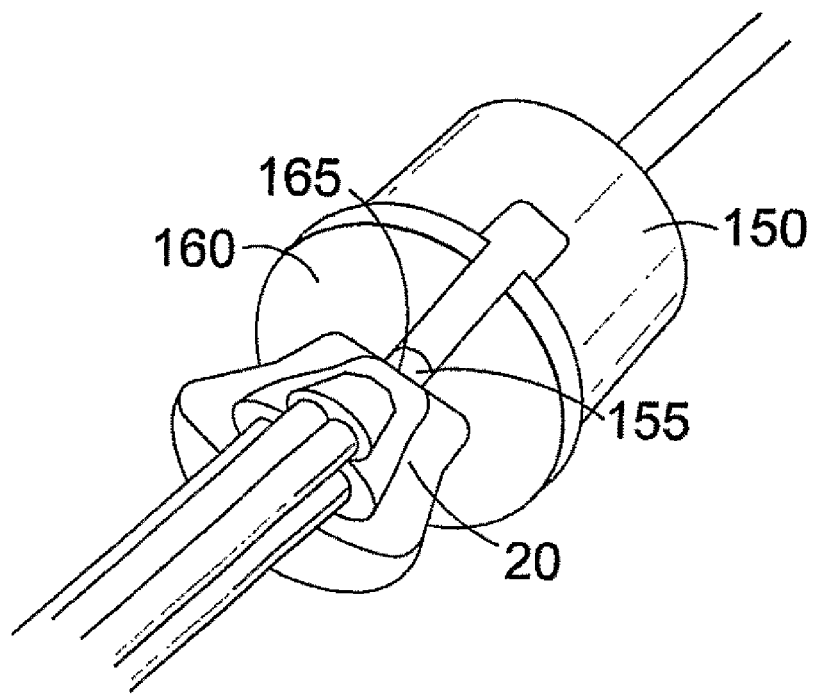
FIG. 7*a* shows a pole of the probe of FIG. 1 on a positioning device.

A positioning device 150 is used to align the hall-effect sensor 10 to the first pole 20, as shown in FIG. 7a. The positioning device 150 includes a centre locator 155 protruding from a magnetic keeper 160. A first magnetic pole 20 is placed on the magnetic keeper 160 and held in place by magnetic attraction and slid into a position such that a face of the pole 20 abuts the centre locator 155. The centre locator 155 is sized such that when the hall-effect sensor 10 is placed against a protruding end face 165 of the locator 155, the hall-effect sensor 10 is in an optimised position in relation to the first magnetic pole 20. An adhesive is applied to the magnetic pole 20 and the hall-effect sensor 10 placed on the end face 165 of the locator 155 such that the hall-effect sensor 10 is correctly positioned with respect to the pole 20 by the locator 155 and adhered to the pole 10 using the adhesive.

Figure 7B:
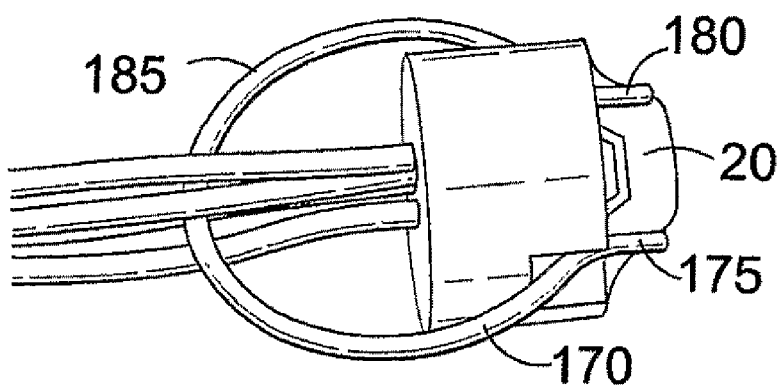
FIG. 7*b* shows a partially assembled probe of FIG. 1 with the poles separated by a spacer.

The RTD 15 is affixed in contact with a side of the hall-effect sensor 10 using a suitable adhesive. A magnet is provided, the magnet defining a cavity through which the wires of the hall-effect sensor and the RTD may pass. The pole piece 20 is affixed to the magnet using an epoxy adhesive, such as Loctite 2701. As shown in FIG. 7b, a spacer 170 is placed into contact with the pole piece 20.

The spacer 170 takes the form of a wire having a thickness corresponding to the optimal separation of the pole pieces 20, 25. Both ends of the wire are formed into upstanding prongs 175, 180 separated by a gap, the remaining wire forming a loop 185 between the end portions 175, 180. The prongs 175, 180 of the spacer 170 are adapted to project between the pole pieces 20, 25 to separate them during fitting and thereby ensure an optimal separation.

The second pole piece 25 is placed into contact with the opposing side of the spacer 170 from the first pole piece 20. A keeper is placed on the probe to secure the pole pieces 20, 25 in position, whereupon the spacer 170 is removed. The prongs 175, 180 of the spacer 170 may be pulled apart to advantageously remove the spacer 170 from between the fixed pole pieces 20, 25. The sensor head is then sealed by injecting the gaps between the poles 20, 25 and around the hall-effect sensor 10 and RTD 15 with an epoxy such as Araldite 2014. Using a positioning device 150 and spacer 170 to place the poles 20, 25, hall-effect sensor 10 and RTD 15 during construction in this way ensures a consistent and accurate placing of the components and results in improved signal strength.

A skilled person will appreciate that variations of the disclosed arrangements are possible without departing from the scope of the invention. For example, whilst the magnets 20, 25 in the sensor head are described as permanent magnets, they may be electromagnets. In addition, whilst the magnetic field sensor 10 is advantageously described as a hall-effect sensor, other magnetic field sensors may be used such as a magnetoresistive sensor. Furthermore, whilst the temperature probe 15 is described as being a RTD, other temperature probes known in the art may be used. Whilst the processing means 35 is described as preferably being a PIC, it would be apparent to a person skilled in the art that other processing means may be used, such as connecting the sensor to a personal computer. Additionally, whilst the manifold conduit 70 is described as being cylindrical, other conformations of manifold may be used such as box-section. Further, whilst the instrument flow channel 90b is shown as a pipe separate from the bypass flow channel 90a, other means of forming the flow channels 90a and 90b may be used such as by using a flow guide.

The invention claimed is:

1. A sensor having:
   a magnetic sensor head adapted to produce a magnetic field;
   a magnetic field sensor responsive to changes in the magnetic field;
   a temperature probe; and
     processing means for determining the amount of material accumulated on the magnetic sensor head based on both magnetic field and temperature data; wherein
     the magnetic sensor head comprises two permanent magnetic or electromagnetic poles and the magnetic field sensor and the temperature sensor are located between the magnetic poles; and
     the processing means is adapted to determine the amount of material accumulated on the magnetic sensor by comparing measured magnetic field and temperature data with data stored in a look up table (LUT), wherein the data stored in the look up table is specific for the associated sensor and comprises correction values for the change in magnetic field with temperature; and wherein
     the processing means is arranged to self calibrate the sensor by using the LUT to determine deviations in magnetic strength with time.

2. A sensor according to claim 1, wherein the sensor is adapted to sense magnetically active or ferrous material.

3. A sensor according to claim 1, wherein the magnetic field sensor is adapted to measure magnetic field strength.

4. A sensor according to claim 1, wherein the magnetic field sensor is a hall-effect sensor.

5. A sensor according to claim 1, wherein the temperature probe has a linear temperature response.

6. A sensor according to claim 1, wherein the processing means is a peripheral interface controller (PIC).

7. A sensor according to claim 1, wherein the LUT is stored in a memory of the processing means.

8. A sensor according to claim 1, wherein the sensor further includes an analogue to digital converter (ADC) for converting an analogue output of the magnetic field sensor and/or temperature probe to a digital signal for input to the processing means.

9. A sensor according to claim 8 wherein the ADC is a 16 bit ADC and/or be adapted to sample with at least 65535 steps of resolution and/or be adapted to sample between 1 and 10 times per second.

10. A sensor according to claim 1, wherein the sensor further comprises actuating means adapted to move the sensor.

11. A sensor system having a sensor as claimed in claim 1, mountable in a manifold, the manifold having at least a first flow channel and a second flow channel, and means for receiving the debris sensor such that the debris sensor is held in communication with one of the flow channels.

12. A sensor system according to claim 11, wherein the first flow channel is adapted to receive the sensor and the second flow channel defines a bypass channel to circumvent the sensor.

13. A sensor system according to claim 12, wherein, wherein the second channel has an adjustable valve or flow restricting device for controlling flow through the second channel and thereby the flow in the first channel.

14. A sensor system according to claim 11, wherein the flow guide is formed from a non-ferrous material.

15. A method for detecting magnetically active or ferrous material, the method including:
providing a sensor having a magnetic sensor head adapted to produce a magnetic field, a magnetic field sensor responsive to changes in the magnetic field and a temperature probe, wherein the magnetic sensor head comprises two permanent magnetic or electromagnetic poles and the magnetic field sensor and the temperature sensor are located between the magnetic poles;
measuring changes in the magnetic field;
measuring the temperature of the sensor; and
determining the amount of ferrous material accumulated in the magnetic sensor head based on both magnetic field and temperature data by comparing measured magnetic field and temperature data with data stored in a look up table (LUT), wherein the data stored in the look up table is specific for the associated sensor and comprises correction values for the change in magnetic field with temperature; and self calibrating the sensor by using the LUT to determine deviations in magnetic strength with time.

* * * * *

UNITED STATES PATENT AND TRADEMARK OFFICE
CERTIFICATE OF CORRECTION

PATENT NO.         : 8,274,287 B2  
APPLICATION NO.    : 12/300500  
DATED              : September 25, 2012  
INVENTOR(S)        : Graham Martin Page 1 of 1

It is certified that error appears in the above-identified patent and that said Letters Patent is hereby corrected as shown below:

On The Title Page, item (73) Assignee should read –

Assignee:
Impact Systems UK Limited
249 West George Street
Glasgow, G2 4RB
Scotland, United Kingdom Signed and Sealed this
Twenty-fourth Day of February, 2015

Michelle K. Lee
*Deputy Director of the United States Patent and Trademark Office*